United States Patent
Jiao

(10) Patent No.: US 10,965,010 B2
(45) Date of Patent: Mar. 30, 2021

(54) TERMINAL DEVICE

(71) Applicant: BEIJING XIAOMI MOBILE SOFTWARE CO., LTD., Beijing (CN)

(72) Inventor: Tao Jiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/689,367

(22) Filed: Nov. 20, 2019

(65) Prior Publication Data
US 2021/0005953 A1 Jan. 7, 2021

(30) Foreign Application Priority Data
Jul. 4, 2019 (CN) .......................... 201910600627.3

(51) Int. Cl.
*H01Q 1/38* (2006.01)
*H01Q 1/24* (2006.01)
*H01Q 1/48* (2006.01)
*H01Q 5/364* (2015.01)
*H04B 7/06* (2006.01)

(52) U.S. Cl.
CPC ............... *H01Q 1/243* (2013.01); *H01Q 1/38* (2013.01); *H01Q 1/48* (2013.01); *H01Q 5/364* (2015.01)

(58) Field of Classification Search
CPC ... H04M 1/026; H04B 1/3833; H04B 1/3888; H01Q 1/243; H01Q 1/38; H01Q 1/48; H01Q 5/364; H01Q 1/378; H01Q 5/10; H01Q 9/42
See application file for complete search history.

(56) References Cited

U.S. PATENT DOCUMENTS

2015/0084817 A1* 3/2015 Yong .................. H01Q 1/243
 343/702
2017/0149118 A1* 5/2017 Wang .................. H01Q 1/243
(Continued)

FOREIGN PATENT DOCUMENTS

CN  203386889 U  1/2014
CN  204289710 U  4/2015
(Continued)

OTHER PUBLICATIONS

Supplementary European Search Report in the European application No. 19213748.7, dated May 25, 2020.

*Primary Examiner* — Thanh C Le
(74) *Attorney, Agent, or Firm* — Syncoda LLC; Feng Ma

(57) ABSTRACT

A terminal device includes a housing, including a first, second and third conductive side frames, two ends of the first side frame being connected with the second and third side frames respectively and the second and third conductive side frames being arranged opposite; a gap formed in the first conductive side frame; a feed point positioned between the second and third conductive side frames, arranged on a bearing plate and configured to input or output an electric signal; a first signal connection line connected with the feed point and first conductive side frame respectively; and a first grounding point positioned on the second or third conductive side frame, wherein the first signal connection line, the first conductive side frame between the feed point and first grounding point and the conductive side frame where the first grounding point is located transmit and receive a first wireless signal together.

17 Claims, 9 Drawing Sheets

(56) References Cited

U.S. PATENT DOCUMENTS

| | | | | |
|---|---|---|---|---|
| 2018/0167120 A1* | 6/2018 | Zhang | ................... | H01Q 1/245 |
| 2018/0358699 A1* | 12/2018 | Li | .......................... | H01Q 1/243 |
| 2019/0260127 A1* | 8/2019 | Shi | .......................... | H01Q 1/38 |
| 2020/0036084 A1* | 1/2020 | Her | ....................... | H04M 1/026 |
| 2020/0106177 A1* | 4/2020 | Zhou | ........................ | H01Q 1/48 |

FOREIGN PATENT DOCUMENTS

| | | |
|---|---|---|
| CN | 105244599 A | 1/2016 |
| CN | 105811103 A | 7/2016 |

\* cited by examiner

TERMINAL DEVICE

CROSS-REFERENCE TO RELATED APPLICATION

This application claims priority to Chinese patent application No. 201910600627.3 filed on Jul. 4, 2019, the disclosure of which is hereby incorporated by reference in its entirety.

BACKGROUND

With rapid development of communication technologies, the number of network standards keep increasing, and an antenna of a terminal device is required to support more and more frequency bands. In addition, with the increase of functions of terminal devices and extreme processing requirements on thin and light appearance and integrity of terminal devices, a placement space for antennas in a terminal device is squeezed and a working environment of the antenna becomes increasingly severe.

SUMMARY

The present disclosure relates generally to the technical field of communication, and more particularly, to a terminal device.

The present disclosure provides a terminal device.

According to a first aspect of embodiments of the present disclosure, a terminal device is provided, which can at least include:

a housing, including a first conductive side frame, a second conductive side frame and a third conductive side frame, two ends of the first conductive side frame being connected with the second conductive side frame and the third conductive side frame respectively and the second conductive side frame and the third conductive side frame being arranged opposite to each other;

a gap, formed in the first conductive side frame;

a feed point, positioned between the second conductive side frame and the third conductive side frame, arranged on a bearing plate in the housing and configured to input or output an electric signal;

a first signal connection line, connected with the feed point and the first conductive side frame respectively; and a first grounding point, positioned on the second conductive side frame or the third conductive side frame, wherein the first signal connection line, the first conductive side frame between the feed point and the first grounding point and the conductive side frame where the first grounding point is located can be configured to transmit and receive a first wireless signal together, a frequency signal value in the first wireless signal being less than a first frequency threshold value.

In some embodiments, the first signal connection line and the first conductive side frame between the feed point and the gap can be configured to transmit and receive a second wireless signal together, a frequency signal value in the second wireless signal being greater than a second frequency threshold value.

In some embodiments, the terminal device can further include a tuning component;

the tuning component can be connected with the first signal connection line; and the first signal connection line can be configured to, when the tuning component is connected to the feed point through the first signal connection line, transmit and receive the second wireless signal of a first frequency and, when the tuning component is not connected to the feed point, transmit and receive the second wireless signal of a second frequency, the first frequency being different from the second frequency and both the first frequency and the second frequency being greater than the second frequency threshold value.

In some embodiments, the first grounding point can be positioned on the third conductive side frame, and the gap can be positioned between the feed point and the second conductive side frame.

In some embodiments, the terminal device can further include:

a second grounding point, positioned between the gap and the feed point or positioned between the third conductive side frame and the feed point; and a second signal connection line, connected with the second grounding point and the first conductive side frame respectively, wherein the second signal connection line, the first conductive side frame between the second grounding point and the gap and the first conductive side frame between the second grounding point and the third conductive side frame can be configured to transmit and receive a third wireless signal together, a frequency signal value in the third wireless signal being between the first frequency threshold value and the second frequency threshold value and the second frequency threshold value being greater than the first frequency threshold value.

In some embodiments, the terminal device can further include a first switch component;

the first switch component can be positioned on the second signal connection line; and the second signal connection line can be configured to, when the first switch component is turned on, transmit and receive the third wireless signal of a third frequency and, when the first switch component is turned off, transmit and receive the third wireless signal of a fourth frequency, both the third frequency and the fourth frequency being between the first frequency threshold value and the second frequency threshold value and the third frequency being different from the fourth frequency.

In some embodiments, the first grounding point can be positioned on the second conductive side frame, and the gap can be positioned between the feed point and the third conductive side frame.

In some embodiments, the terminal device can further include:

a third grounding point, positioned between the second conductive side frame and the feed point or positioned between the gap and the feed point; and a third signal connection line, connected with the third grounding point and the first conductive side frame respectively, wherein the third signal connection line, the first conductive side frame between the third grounding point and the gap and the first conductive side frame between the third grounding point and the second conductive side frame can be configured to transmit and receive the third wireless signal together, the frequency signal value in the third wireless signal being between the first frequency threshold value and the second frequency threshold value and the second frequency threshold value being greater than the first frequency threshold value.

In some embodiments, the terminal device can further include a second switch component;

the second switch component can be positioned on the third signal connection line; and the third signal connection line can be configured to, when the second switch component is turned on, transmit and receive the third wireless signal of a fifth frequency and, when the second switch component is turned off, transmit and receive the third wireless signal of a sixth frequency, both the fifth frequency and the sixth frequency being between the first frequency threshold value and the second frequency threshold value and the fifth frequency being different from the sixth frequency.

In some embodiments, the terminal device can further include:

a connection interface, positioned between the second conductive side frame and the third conductive side frame and at least configured to convert the received first wireless signal into an electric signal and/or provide an electric signal to be converted into the first wireless signal required to be sent, wherein the feed point can be positioned between the connection interface and the second conductive side frame or positioned between the connection interface and the third conductive side frame.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The performance of the antenna can be affected on a compact and crowded mobile device, because a wireless signal may be blocked. Various embodiments of the present disclosure can improve the antenna's capability of transmitting signals from the limited space of the mobile device.

Figure 1:
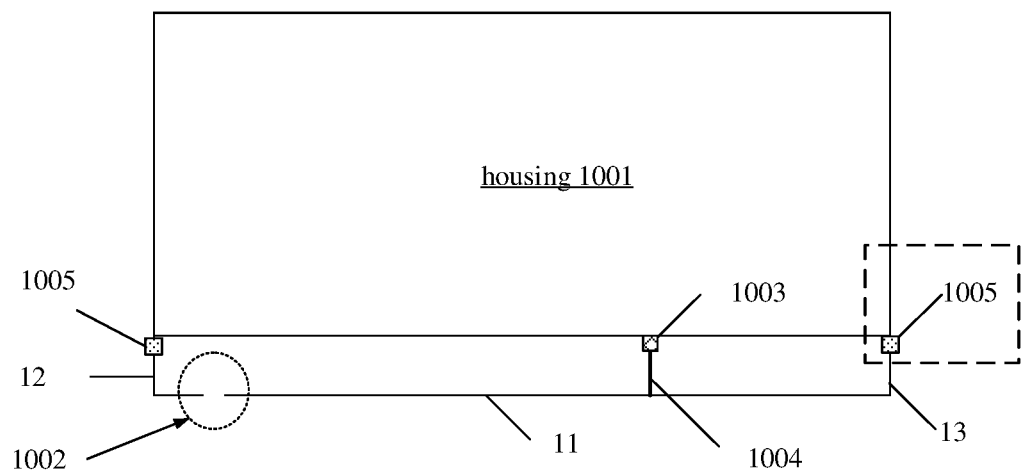
FIG. 1 is a first structure diagram of a terminal device, according to some embodiments of the present disclosure.

FIG. 1 is a first structure diagram of a terminal device, according to some embodiments of the present disclosure. As illustrated in FIG. 1, the terminal device at least includes:

a housing 1001, including a first conductive side frame 11, a second conductive side frame 12 and a third conductive side frame 13, two ends of the first conductive side frame 11 being connected with the second conductive side frame 12 and the third conductive side frame 13 respectively and the second conductive side frame 12 and the third conductive side frame 13 being arranged opposite to each other;

a gap 1002, formed in the first conductive side frame 11;

a feed point 1003, positioned between the second conductive side frame 12 and the third conductive side frame 13, arranged on a bearing plate in the housing and configured to input or output an electric signal;

a first signal connection line 1004, connected with the feed point and the first conductive side frame respectively; and a first grounding point 1005, positioned on the second conductive side frame 12 or the third conductive side frame 13, wherein the first signal connection line 1004, the first conductive side frame 11 between the feed point 1003 and the first grounding point 1005 and the conductive side frame where the first grounding point 1005 is located are configured to transmit and receive a first wireless signal together, a frequency signal value in the first wireless signal being less than a first frequency threshold value.

In some embodiments of the present disclosure, the terminal device at least includes the housing 1001, the gap 1002, the feed point 1003, the first signal connection line 1004 and the first grounding point 1005.

Exemplarily, the terminal device can include, but not limited to, a mobile device or a wearable device. The mobile terminal includes a smart phone, a tablet computer and an electronic book reader.

It is to be noted that a shape of the housing of the terminal device can be set according to a requirement of a user. For example, the housing of the terminal device is arranged in an approximately rectangular shape.

In some embodiments of the present disclosure, the housing 1001 includes the first conductive side frame 11, the second conductive side frame 12 and the third conductive side frame 13.

It is to be noted that the conductive frame can be a frame made from a metal or an alloy.

In some embodiments of the present disclosure, the gap 1002 is formed in the first conductive side frame 11.

It is to be noted that the gap 1002 provides a transmission and reception input port and/or transmission and reception output port with proper widths/a proper width for the wireless signal to further improve transmission and reception efficiency of the terminal device.

Exemplarily, a width of the gap 1002 can be 0.8 mm to 3 mm.

In some embodiments of the present disclosure, the feed point 1003 is arranged on the bearing plate in the housing, and is connected with a signal transmission and reception component on the bearing plate through a feed line.

Exemplarily, the bearing plate includes, but not limited to, a Printed Circuit Board (PCB) of the terminal device.

In some embodiments of the present disclosure, the first grounding point 1005 is positioned on the second conductive side frame 12 or the third conductive side frame 13, and is connected with a ground wire on the bearing plate.

Exemplarily, manners for connecting the feed point 1003 and the first grounding point 1005 with the bearing plate respectively include, but not limited to, a pogo pin and welding.

In some embodiments, the terminal device further includes:

a connection interface, positioned between the second conductive side frame and the third conductive side frame and at least configured to convert the received first wireless signal into an electric signal and/or provide an electric signal to be converted into the first wireless signal required to be sent, wherein the feed point is positioned between the connection interface and the second conductive side frame or positioned between the connection interface and the third conductive side frame.

Exemplarily, the connection interface includes, but not limited to, a data transmission interface and a charging interface.

In some embodiments, the first signal connection line 1004, the first conductive side frame 11, the second conductive side frame 12 and the third conductive side frame 13 form an Inverted F Antenna (IFA).

That is, the conductive side frames of the terminal device form the IFA. The IFA does not occupy any additional space of the terminal device anymore, so that the problem that performance is affected because an antenna placement space in the terminal device is squeezed is solved, and a space utilization rate of the terminal device is increased.

In some embodiments of the present disclosure, the first signal connection line 1004, first conductive side frame 11 between the feed point 1003 and the first grounding point 1005 and conductive side frame where the first grounding point 1005 is located in the IFA are configured to transmit and receive the first wireless signal together.

It is to be noted that transmission and reception of the first wireless signal includes transmission of the first wireless signal and reception of the first wireless signal.

Exemplarily, the first wireless signal can be a wireless signal of a frequency band of 700 MHz to 960 MHz.

Figure 2:
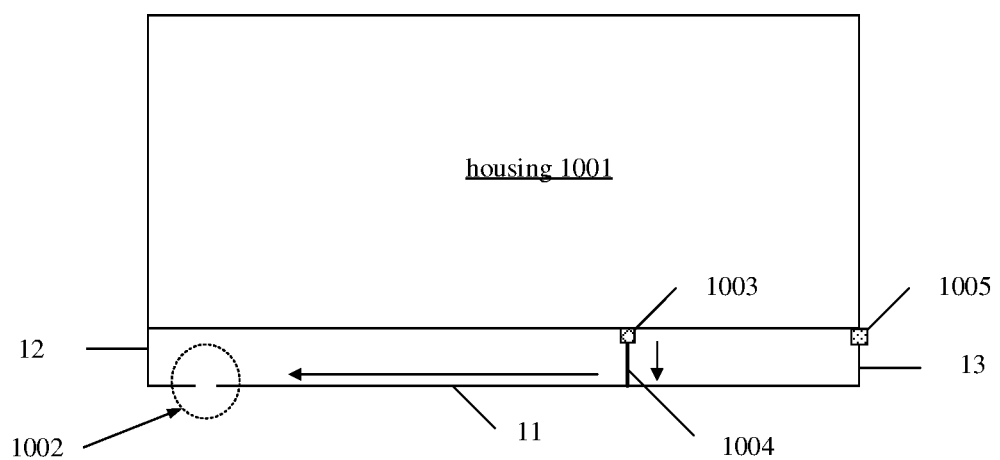
FIG. 2 is a schematic diagram illustrating a signal flow direction of a second wireless signal of a terminal device, according to some embodiments of the present disclosure.

In some embodiments, as illustrated in FIG. 2, the first signal connection line 1004 and the first conductive side frame 11 between the feed point 1003 and the gap 1002 are configured to transmit and receive a second wireless signal together, a frequency signal value in the second wireless signal being greater than a second frequency threshold value.

In some embodiments of the present disclosure, the feed point 1003, the first signal connection line 1004, the third conductive side frame 13 and the first grounding point 1005 form a loop antenna. The loop antenna is an antenna formed by winding a wire into a certain shape such as a round, a square and a triangle, and the antenna is an antenna taking two ends of a conductor as input and output ends.

That is, the terminal device couples the second wireless signal by use of the loop antenna formed by the feed point 1003, the first signal connection line 1004, the third conductive side frame 13 and the first grounding point 1005.

In some embodiments of the present disclosure, when the terminal device transmits and receives the second wireless signal, the signal reaches the gap 1002 from the feed point 1003 through the first signal connection line 1004 and then the first conductive side frame 11 between the feed point 1003 and the gap 1002, and is finally transmitted to and received from the outside of the terminal device through the gap 1002.

Exemplarily, the second wireless signal can be a wireless signal of a frequency band of 2,300 MHz to 2,690 MHz.

In some embodiments, the terminal device further includes a tuning component;

the tuning component is connected with the first signal connection line; and the first signal connection line 1004 is configured to, when the tuning component is connected to the feed point 1003 through the first signal connection line 1004, transmit and receive the second wireless signal of a first frequency and, when the tuning component is not connected to the feed point 1003, transmit and receive the second wireless signal of a second frequency, the first frequency being different from the second frequency and both the first frequency and the second frequency being greater than the second frequency threshold value.

That is, the tuning component in some embodiments of the present disclosure is connected to the feed point 1003 through the first signal connection line 1004, and then the second wireless signal transmitted and received by the terminal device can be switched between the first frequency and the second frequency, so that coverage is improved.

Exemplarily, the tuning component includes, but not limited to, an antenna tuner.

Figure 3:
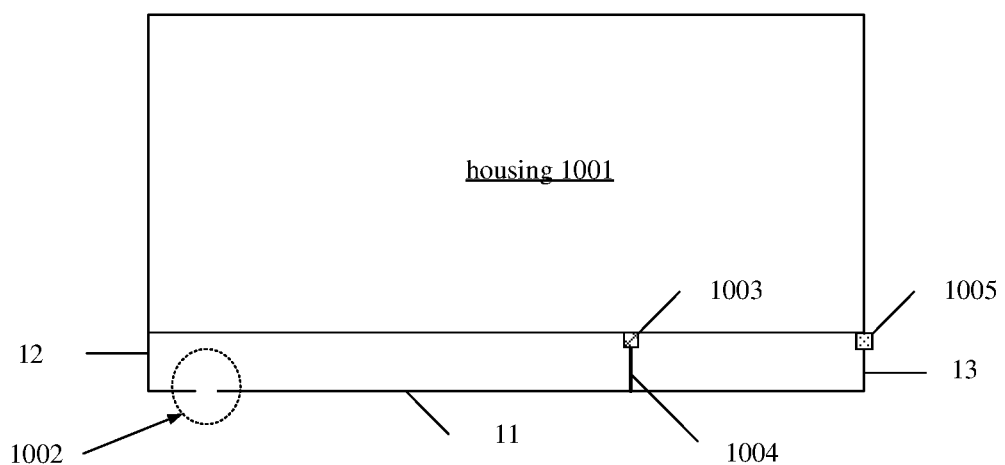
FIG. 3 is a second structure diagram of a terminal device, according to some embodiments of the present disclosure.

In some embodiments, as illustrated in FIG. 3, the first grounding point 1005 is positioned on the third conductive side frame 13, and the gap 1002 is positioned between the feed point 1003 and the second conductive side frame 12.

In some embodiments of the present disclosure, the gap 1002 is positioned between the feed point 1003 and the second conductive side frame 12, namely the gap 1002 is formed relatively close to the side where the second conductive side frame 12 is located.

Figure 4:
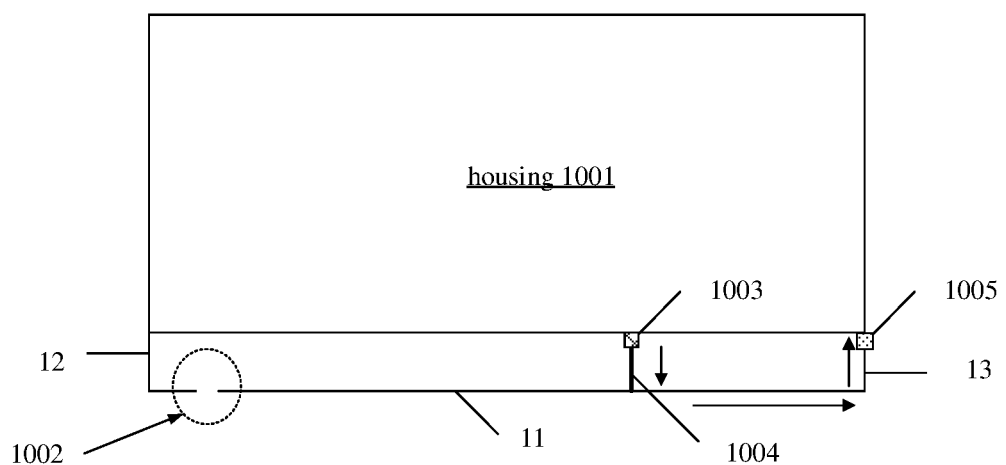
FIG. 4 is a first schematic diagram illustrating a signal flow direction of a first wireless signal of a terminal device, according to some embodiments of the present disclosure.

As illustrated in FIG. 4, when the terminal device transmits and receives the first wireless signal, the signal reaches the ground wire of the terminal device from the feed point 1003 through the first signal connection line 1004, then the first conductive side frame 11 between the feed point 1003 and the third conductive side frame 13 and the third conductive side frame 13 and finally the first grounding point 1005.

In some embodiments of the present disclosure, the first conductive side frame 11 is connected with the third conductive side frame 13, and the first signal connection line 1004 is connected with the first conductive side frame 11, so that a wireless signal transmission and reception direction of the first conductive side frame 11 is different from a wireless signal transmission and reception direction of the third conductive side frame 13. Therefore, the terminal device can transmit and receive the first wireless signal based on different directions, the probability that the wireless signal is completely blocked can be reduced, and performance of the terminal device in transmission and reception of the first wireless signal is improved.

Figure 5:
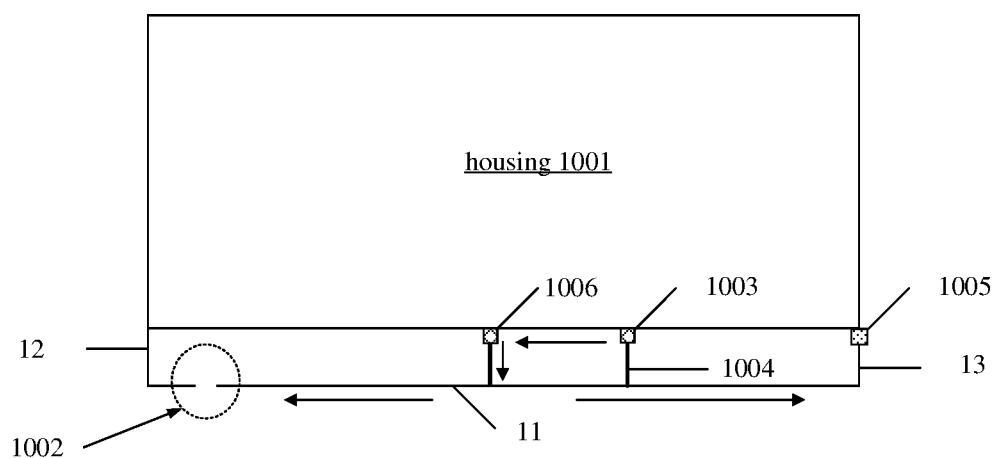
FIG. 5 is a first schematic diagram illustrating a signal flow direction of a third wireless signal of a terminal device, according to some embodiments of the present disclosure.

In some embodiments, as illustrated in FIG. 5, the terminal device 1000 further includes:

a second grounding point 1006, positioned between the gap 1002 and the feed point 1003 or positioned between the third conductive side frame 13 and the feed point 1003; and a second signal connection line, connected with the second grounding point and the first conductive side frame respectively, wherein the second signal connection line, the first conductive side frame between the second grounding point 1006 and the gap 1003 and the first conductive side frame 11 between the second grounding point 1006 and the third conductive side frame 13 are configured to transmit and receive a third wireless signal together, a frequency signal value in the third wireless signal being between the first frequency threshold value and the second frequency threshold value.

In some embodiments of the present disclosure, when the terminal device transmits and receives the third wireless signal, the signal reaches the second grounding point 1006 from the feed point 1003, then reaches the gap 1002 through the second signal connection line and the first conductive side frame 11 between the second grounding point 1006 and the gap 1002, and is finally transmitted to and received from the outside of the terminal device through the gap 1002.

Exemplarily, the third wireless signal can be a wireless signal of a frequency band of 960 MHz to 2,300 MHz.

In some embodiments, the terminal device further includes the connection interface, wherein the connection interface is positioned between the second conductive side frame 12 and the third conductive side frame 13; and the feed point 1003 is positioned between the connection interface and the third conductive side frame 13, and the second grounding point 1006 is positioned between the gap 1002 and the connection interface.

In some embodiments, the terminal device further includes the connection interface, wherein the connection interface is positioned between the second conductive side frame 12 and the third conductive side frame 13; and the feed point 1003 is positioned between the connection interface and the gap 1002, and the second grounding point 1006 is positioned between the gap 1002 and the third conductive side frame 13.

In some embodiments of the present disclosure, the second grounding point 1006 is connected to the ground wire on the bearing plate in the housing. For example, a manner for connecting the second grounding point 1006 with the bearing plate includes, but not limited to, the pogo pin and welding.

In some embodiments, the terminal device further includes a first switch component; the first switch component is positioned on the second signal connection line; and the second signal connection line is configured to, when the first switch component is turned on, transmit and receive the third wireless signal of a third frequency and, when the first switch component is turned off, transmit and receive the third wireless signal of a fourth frequency, both the third frequency and the fourth frequency being between the first frequency threshold value and the second frequency threshold value and the third frequency being different from the fourth frequency.

In some embodiments of the present disclosure, a switching device has a selection function and can select to turn on different discrete components for connection and combination with the discrete components into different tuning states to further enable the terminal device to tune the second wireless signal of different frequencies.

It is to be noted that, when the first switch component turns on a discrete component, namely the first switch component is turned on, the wireless signal of the first frequency is transmitted and received and, when the first switch component does not turn on the discrete component, namely the first switch component is turn off, the second wireless signal of the second frequency is transmitted and received.

Exemplarily, the discrete component includes, but not limited to, an inductor and a capacitor.

In some embodiments, the terminal device further includes an inductor;

the inductor is positioned between the first switch component and the ground wire, and is connected with the first switch component and the ground wire respectively; and when the first switch component is connected with the ground wire through the inductor, the terminal device can transmit and receive the second wireless signal of a first sub-frequency.

In some embodiments, the terminal device further includes a capacitor;

the capacitor is positioned between the first switch component and the ground wire, and is connected with the first switch component and the ground wire respectively; and when the first switch component is connected with the ground wire through the capacitor, the terminal device can transmit and receive the second wireless signal of a second sub-frequency.

It is to be noted that the second wireless signal of the first sub-frequency is different from the second wireless signal of the second sub-frequency.

In some embodiments of the present disclosure, different inductors and capacitors can be selected through the first switch component to switch the terminal device between different sub-frequencies between the first frequency threshold value and the second frequency threshold value, so that the coverage is improved.

Figure 6:
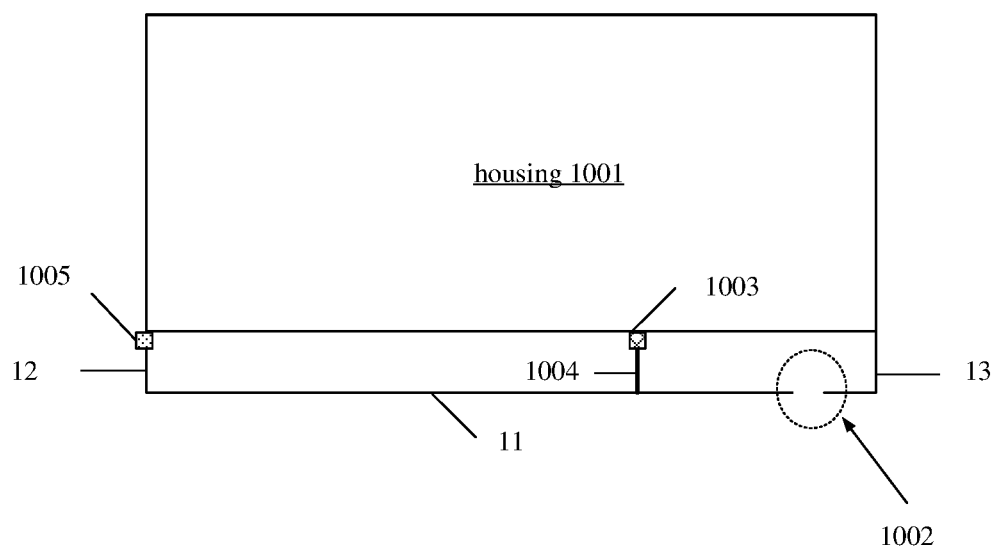
FIG. 6 is a third structure diagram of a terminal device, according to some embodiments of the present disclosure.

In some embodiments, as illustrated in FIG. 6, the first grounding point 1005 is positioned on the second conductive side frame 12, and the gap 1002 is positioned between the feed point 1003 and the third conductive side frame 13.

In some embodiments of the present disclosure, the gap 1002 is positioned between the feed point 1003 and the third conductive side frame 13, namely the gap 1002 is formed relatively close to the side where the third conductive side frame 13 is located.

Figure 7:
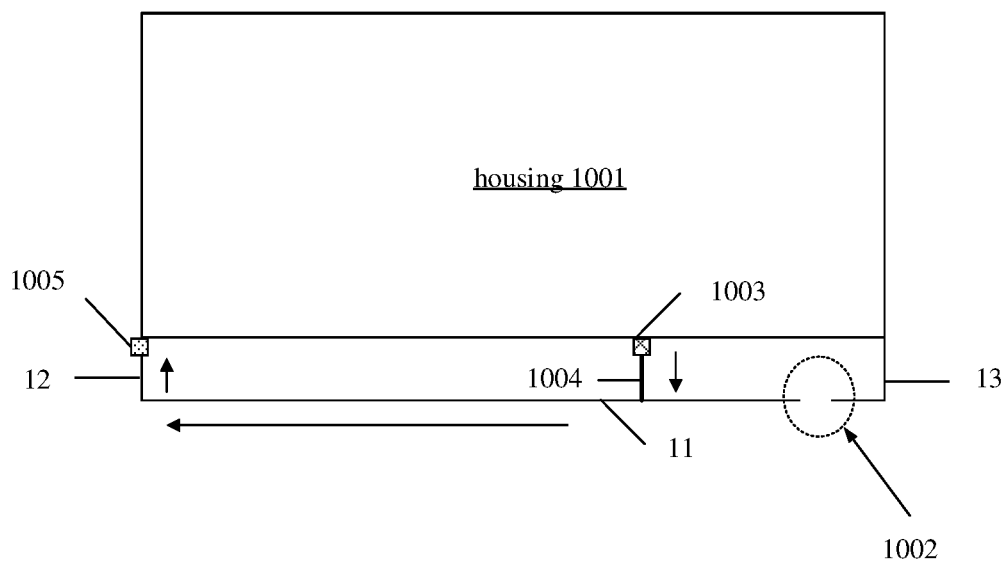
FIG. 7 is a second schematic diagram illustrating a signal flow direction of a first wireless signal of a terminal device, according to some embodiments of the present disclosure.

As illustrated in FIG. 7, when the terminal device transmits and receives the first wireless signal, the signal reaches the first grounding point 1005 from the feed point 1003 through the first signal connection line 1004, then the first conductive side frame 11 between the feed point 1003 and the second conductive side frame 12 and the second conductive side frame 12, and finally reaches the ground wire of the terminal device through the first grounding point 1005.

In some embodiments of the present disclosure, the first conductive side frame 11 is connected with the third conductive side frame 13, and the first signal connection line 1004 is connected with the first conductive side frame 11, so that the wireless signal transmission and reception direction of the first conductive side frame 11 is different from the wireless signal transmission and reception direction of the third conductive side frame 13. Therefore, the terminal device can transmit and receive the first wireless signal based on different directions, the probability that the wireless signal is completely blocked can be reduced, and the performance of the terminal device in transmission and reception of the first wireless signal is improved.

Figure 8:
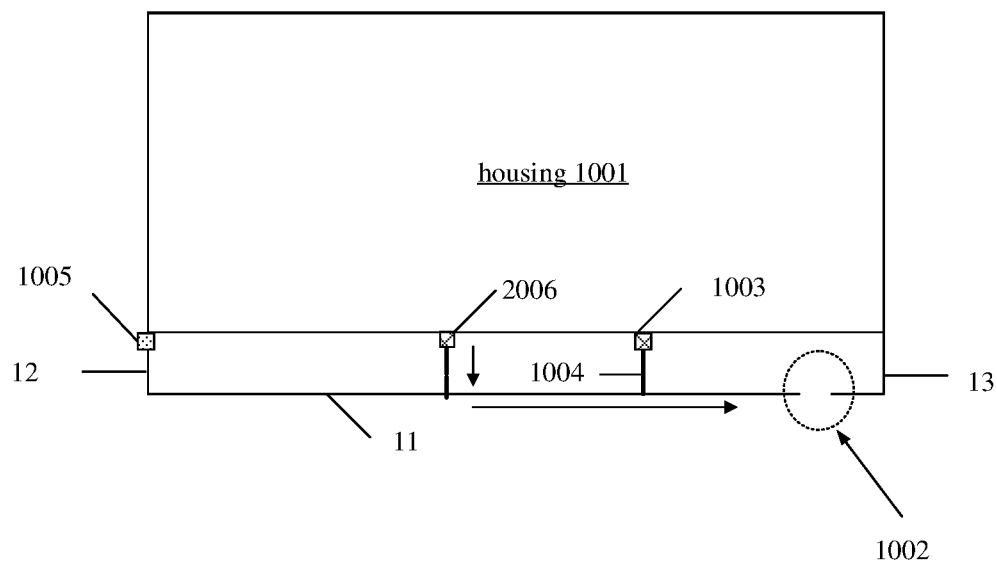
FIG. 8 is a second schematic diagram illustrating a signal flow direction of a third wireless signal of a terminal device, according to some embodiments of the present disclosure.

In some embodiments, as illustrated in FIG. 8, a third grounding point 2006 is positioned between the second conductive side frame 12 and the feed point 1003 or positioned between the gap 1002 and the feed point 1003;

a third signal connection line is connected with the third grounding point 2006 and the first conductive side frame 11 respectively; and the third signal connection line, the first conductive side frame 11 between the third grounding point 2006 and the gap 1002 and the first conductive side frame 11 between the third grounding point 2006 and the second conductive side frame 12 are configured to transmit and receive the third wireless signal together, the frequency signal value in the third wireless signal being between the first frequency threshold value and the second frequency threshold value and the second frequency threshold value being greater than the first frequency threshold value.

In some embodiments of the present disclosure, the third grounding point 2006 is connected to the ground wire on the bearing plate. For example, a manner for connecting the third grounding point 2006 with the bearing plate includes, but not limited to, the pogo pin and welding.

It is to be noted that, when the terminal device transmits and receives the third wireless signal, the signal reaches the third grounding point 2006 from the feed point 1003, then reaches the gap 1002 through the third signal connection line and the first conductive side frame 11 between the third grounding point 2006 and the gap 1002, and is finally transmitted to and received from the outside of the terminal device through the gap 1002.

Exemplarily, the third wireless signal can be a wireless signal of the frequency band of 960 MHz to 2300 MHz.

In some embodiments, the terminal device further includes the connection interface, wherein the connection interface is positioned between the second conductive side frame 12 and the third conductive side frame 13; and the feed point 1003 is positioned between the connection interface and the gap 1002, and the third grounding point 2006 is positioned between the second conductive side frame 12 and the connection interface.

In some embodiments, the terminal device further includes the connection interface, wherein the connection interface is positioned between the second conductive side frame 12 and the third conductive side frame 13; and the feed point 1003 is positioned between the connection interface and the second conductive side frame 12, and the third grounding point 2006 is positioned between the gap 1002 and the connection interface.

In some embodiments, the terminal device further includes a second switch component; the second switch component is positioned on the third signal connection line; and the third signal connection line is configured to, when the second switch component is turned on, transmit and receive the third wireless signal of a fifth frequency and, when the second switch component is turned off, transmit and receive the third wireless signal of a sixth frequency, both the fifth frequency and the sixth frequency being between the first frequency threshold value and the second frequency threshold value and the fifth frequency being different from the sixth frequency.

In some embodiments of the present disclosure, a second switching device has the selection function and can select to turn on different discrete components for connection and combination with the discrete components into different tuning states to further enable the terminal device to tune the second wireless signal of different frequencies.

It is to be noted that, when the second switch component turns on a discrete component, namely the second switch component is turned on, the wireless signal of the fifth frequency is transmitted and received and, when the second switch component does not turn on the discrete component, namely the second switch component is turn off, the second wireless signal of the sixth frequency is transmitted and received.

Exemplarily, the discrete component includes, but not limited to, an inductor and a capacitor.

In some embodiments, the terminal device further includes the inductor;

the inductor is positioned between the second switch component and the ground wire, and is connected with the second switch component and the ground wire respectively; and when the second switch component is connected with the ground wire through the inductor, the terminal device can transmit and receive the second wireless signal of the first sub-frequency.

In some embodiments, the terminal device further includes the capacitor;

the capacitor is positioned between the second switch component and the ground wire, and is connected with the second switch component and the ground wire respectively; and when the second switch component is connected with the ground wire through the capacitor, the terminal device can transmit and receive the second wireless signal of the second sub-frequency.

It is to be noted that the second wireless signal of the first sub-frequency is different from the second wireless signal of the second sub-frequency.

According to some embodiments of the present disclosure, the terminal device can be switched between different sub-frequencies between the first frequency threshold value and the second frequency threshold value through an on/off state of the second switch component and different selected inductors and capacitors, so that the coverage is improved.

Various embodiments of the present disclosure can have one or more of the following advantages. A single gap is taken as a transceiver of the terminal device, and a signal reaches the first grounding point through the first signal connection line, then the first conductive side frame between the feed point and the third conductive side frame and the third conductive side frame. In such a manner, on one hand, transmitting and receiving signals by use of the conductive side frames in the housing can implement signal transmission and reception without occupying an additional placement space of the terminal device, so that a space utilization rate of the terminal device is increased. On the other hand, the first conductive side frame is connected with the third conductive side frame, and a wireless signal transmission and reception direction of the first conductive side frame is different from a wireless signal transmission and reception direction of the third conductive side frame, so that the terminal device can transmit and receive the first wireless signal based on different directions, the probability that the wireless signal is completely blocked can be reduced, and performance of the terminal device in transmission and reception of the first wireless signal is improved.

Figure 9:
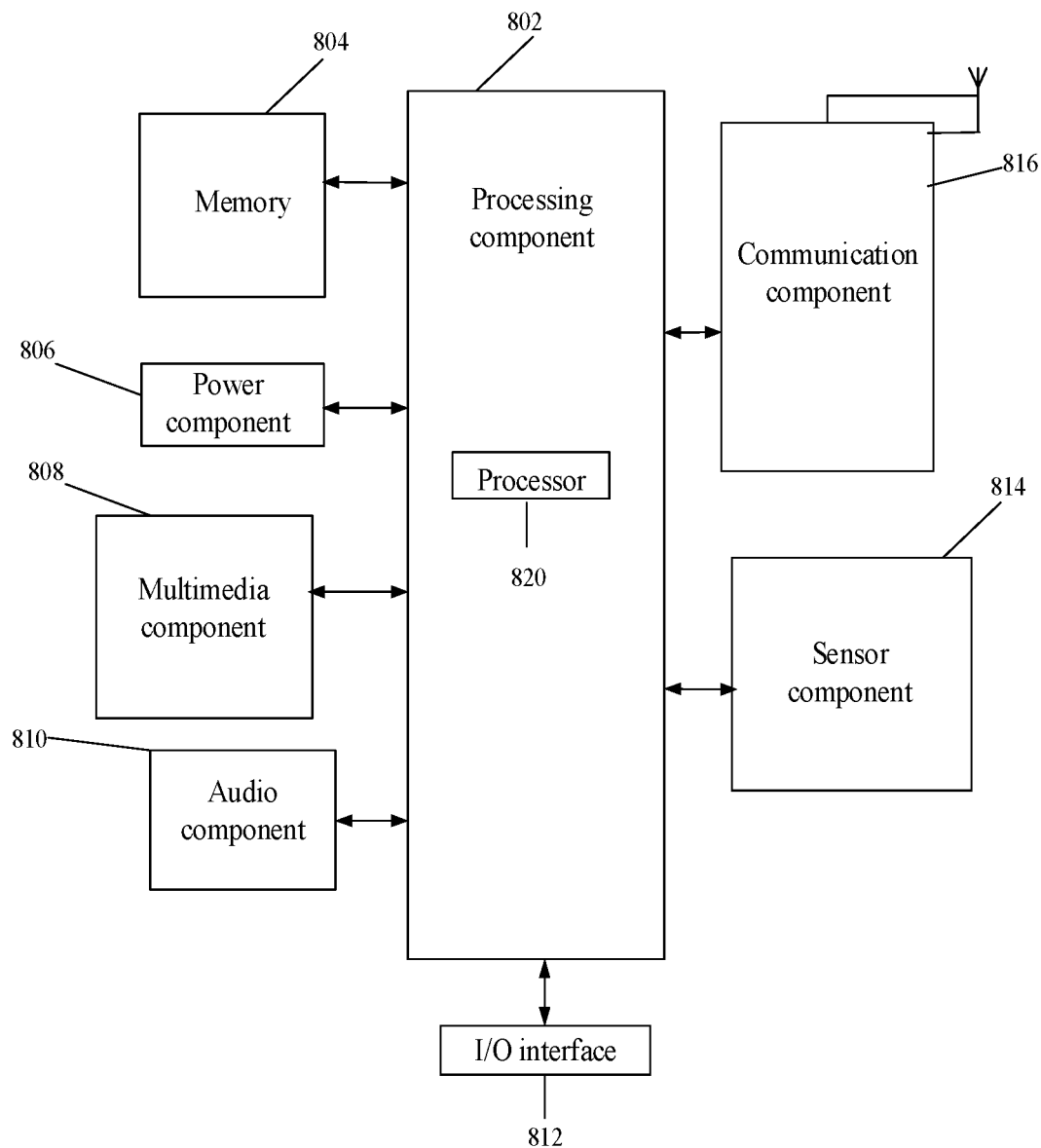
FIG. 9 is a fourth structure diagram of a terminal device, according to some embodiments of the present disclosure.

FIG. 9 is a block diagram of a terminal device 800, according to some embodiments of the present disclosure. For example, the terminal device 800 can be a mobile phone, a computer, a digital broadcast terminal, a messaging device, a gaming console, a tablet, a medical device, exercise equipment, a personal digital assistant and the like.

Referring to FIG. 9, the terminal device 800 can include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 can include one or more processors 820 to execute instructions to perform all or part of the steps in the abovementioned method. Moreover, the processing component 802 can include one or more modules which facilitate interaction between the processing component 802 and the other components. For instance, the processing component 802 can include a multimedia module to facilitate interaction between the multimedia component 808 and the processing component 802.

The memory 804 is configured to store various types of data to support the operation of the terminal device 800. Examples of such data include instructions for any application programs or methods operated on the terminal device 800, contact data, phonebook data, messages, pictures, video, etc. The memory 804 can be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal device 800. The power component 806 can include a power management system, one or more power supplies, and other components associated with generation, management and distribution of power for the terminal device 800.

The multimedia component 808 includes a screen providing an output interface between the terminal device 800 and a user. In some embodiments, the screen can include a Liquid Crystal Display (LCD) and a Touch Panel (TP). In some embodiments, an organic light-emitting diode (OLED) display or other types of displays can be adopted.

If the screen includes the TP, the screen can be implemented as a touch screen to receive an input signal from the user. The TP includes one or more touch sensors to sense touches, swipes and gestures on the TP. The touch sensors can not only sense a boundary of a touch or swipe action but also detect a duration and pressure associated with the touch or swipe action. In some embodiments, the multimedia component 808 includes a front camera and/or a rear camera. The front camera and/or the rear camera can receive external multimedia data when the terminal device 800 is in an operation mode, such as a photographing mode or a video mode. Each of the front camera and the rear camera can be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal device 800 is in the operation mode, such as a call mode, a recording mode and a voice recognition mode. The received audio signal can further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module can be a keyboard, a click wheel, a button and the like. The button can include, but not limited to: a home button, a volume button, a starting button and a locking button.

The sensor component 814 includes one or more sensors configured to provide status assessment in various aspects for the terminal device 800. For instance, the sensor component 814 can detect an on/off status of the terminal device 800 and relative positioning of components, such as a display and small keyboard of the terminal 800, and the sensor component 814 can further detect a change in a position of the terminal 800 or a component of the terminal device 800, presence or absence of contact between the user and the terminal device 800, orientation or acceleration/deceleration of the terminal device 800 and a change in temperature of the terminal device 800. The sensor component 814 can include a proximity sensor configured to detect presence of an object nearby without any physical contact. The sensor component 814 can also include a light sensor, such as a Complementary Metal Oxide Semiconductor (CMOS) or Charge Coupled Device (CCD) image sensor, configured for use in an imaging APP. In some embodiments, the sensor component 814 can also include an acceleration sensor, a gyroscope sensor, a magnetic sensor, a pressure sensor or a temperature sensor.

The communication component 816 is configured to facilitate wired or wireless communication between the terminal device 800 and another device. The terminal device 800 can access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 816 receives a broadcast signal or broadcast associated information from an external broadcast management system through a broadcast channel. In some embodiments of the present disclosure, the communication component 816 further includes a Near Field Communication (NFC) module to facilitate short-range communication. For example, the NFC module can be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the terminal device 800 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 804 including an instruction, and the instruction can be executed by the processor 820 of the terminal device 800 to implement the abovementioned method. For example, the non-transitory computer-readable storage medium can be a ROM, a Compact Disc Read-Only Memory (CD-ROM), a magnetic tape, a floppy disc, an optical data storage device and the like.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other types of displays for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The invention claimed is:

1. A terminal device, comprising:
    a housing, comprising a first conductive side frame, a second conductive side frame and a third conductive side frame, two ends of the first conductive side frame being connected with the second conductive side frame and the third conductive side frame respectively and the second conductive side frame and the third conductive side frame being arranged opposite to each other;
    a gap, formed in the first conductive side frame;
    a feed point, positioned between the second conductive side frame and the third conductive side frame, arranged on a bearing plate in the housing and configured to input or output an electric signal;
    a first signal connection line, connected with the feed point and the first conductive side frame respectively; and
    a first grounding point, positioned on the second conductive side frame or the third conductive side frame, wherein
    the first signal connection line, the first conductive side frame between the feed point and the first grounding point, and the conductive side frame where the first grounding point is located are configured to transmit and receive a first wireless signal together, a frequency signal value in the first wireless signal being less than a first frequency threshold value.

2. The terminal device of claim 1, wherein the first signal connection line and the first conductive side frame between the feed point and the gap are configured to transmit and receive a second wireless signal together, a frequency signal value in the second wireless signal being greater than a second frequency threshold value.

3. The terminal device of claim 2, further comprising a tuning component, wherein
the tuning component is connected with the first signal connection line; and
the first signal connection line is configured to, when the tuning component is connected to the feed point through the first signal connection line, transmit and receive the second wireless signal of a first frequency and, when the tuning component is not connected to the feed point, transmit and receive the second wireless signal of a second frequency, the first frequency being different from the second frequency and both the first frequency and the second frequency being greater than the second frequency threshold value.

4. The terminal device of claim 1, wherein
the first grounding point is positioned on the third conductive side frame, and the gap is positioned between the feed point and the second conductive side frame.

5. The terminal device of claim 4, further comprising:
a second grounding point, positioned between the gap and the feed point or positioned between the third conductive side frame and the feed point; and
a second signal connection line, connected with the second grounding point and the first conductive side frame respectively, wherein
the second signal connection line, the first conductive side frame between the second grounding point and the gap, and the first conductive side frame between the second grounding point and the third conductive side frame are configured to transmit and receive a third wireless signal together, a frequency signal value in the third wireless signal being between the first frequency threshold value and the second frequency threshold value and the second frequency threshold value being greater than the first frequency threshold value.

6. The terminal device of claim 5, further comprising a first switch component, wherein
the first switch component is positioned on the second signal connection line; and
the second signal connection line is configured to, when the first switch component is turned on, transmit and receive the third wireless signal of a third frequency and, when the first switch component is turned off, transmit and receive the third wireless signal of a fourth frequency, both the third frequency and the fourth frequency being between the first frequency threshold value and the second frequency threshold value and the third frequency being different from the fourth frequency.

7. The terminal device of claim 6, further comprising an inductor, wherein the inductor is positioned between the first switch component and a ground wire, and is connected with the first switch component and the ground wire respectively; and
the terminal device is configured to: when the first switch component is connected with the ground wire through the inductor, transmit and receive the second wireless signal of a first sub-frequency.

8. The terminal device of claim 6, further comprising a capacitor, wherein the capacitor is positioned between the first switch component and a ground wire, and is connected with the first switch component and the ground wire respectively; and the terminal device is configured to: when the first switch component is connected with the ground wire through the capacitor, transmit and receive the second wireless signal of a second sub-frequency.

9. The terminal device of claim 1, wherein
the first grounding point is positioned on the second conductive side frame, and the gap is positioned between the feed point and the third conductive side frame.

10. The terminal device of claim 9, further comprising:
a third grounding point, positioned between the second conductive side frame and the feed point or positioned between the gap and the feed point; and
a third signal connection line, connected with the third grounding point and the first conductive side frame respectively, wherein
the third signal connection line, the first conductive side frame between the third grounding point and the gap, and the first conductive side frame between the third grounding point and the second conductive side frame are configured to transmit and receive the third wireless signal together, the frequency signal value in the third wireless signal being between the first frequency threshold value and the second frequency threshold value and the second frequency threshold value being greater than the first frequency threshold value.

11. The terminal device of claim 10, further comprising a second switch component, wherein
the second switch component is positioned on the third signal connection line; and
the third signal connection line is configured to, when the second switch component is turned on, transmit and receive the third wireless signal of a fifth frequency and, when the second switch component is turned off, transmit and receive the third wireless signal of a sixth frequency, both the fifth frequency and the sixth frequency being between the first frequency threshold value and the second frequency threshold value and the fifth frequency being different from the sixth frequency.

12. The terminal device of claim 1, further comprising:
a connection interface, positioned between the second conductive side frame and the third conductive side frame and at least configured to convert the received first wireless signal into an electric signal and/or provide an electric signal to be converted into the first wireless signal required to be sent, wherein
the feed point is positioned between the connection interface and the second conductive side frame or positioned between the connection interface and the third conductive side frame.

13. The terminal device of claim 1, wherein the terminal device is a mobile phone, and further comprises a display screen.

14. The terminal device of claim 13, wherein the gap is a single gap configured as a transceiver of the mobile phone.

15. The terminal device of claim 14, wherein the mobile phone is configured to have a signal reaching the first grounding point through, sequentially, the first signal connection line, the first conductive side frame between the feed point and the third conductive side frame, and the third conductive side frame.

16. The terminal device of claim 15, wherein the mobile phone is configured to transmit and receive signals with the conductive side frames in the housing without occupying an additional antenna placement space, thereby increasing space utilization rate of the mobile phone.

17. The terminal device of claim 16, wherein the first conductive side frame is connected with the third conductive side frame, and a wireless signal transmission and reception direction of the first conductive side frame is different from a wireless signal transmission and reception direction of the third conductive side frame, such that the terminal device is configured to transmit and receive the first wireless signal at different directions, thereby reducing a probability for the wireless signal to be completely blocked.

* * * * *